United States Patent
Yuan et al.

(10) Patent No.: US 10,699,377 B2
(45) Date of Patent: Jun. 30, 2020

(54) METHOD, DEVICE, AND CAMERA FOR BLENDING A FIRST AND A SECOND IMAGE HAVING OVERLAPPING FIELDS OF VIEW

(71) Applicant: Axis AB, Lund (SE)

(72) Inventors: Song Yuan, Lund (SE); Hampus Linse, Lund (SE)

(73) Assignee: Axis AB, Lund (SE)

( * ) Notice: Subject to any disclaimer, the term of this patent is extended or adjusted under 35 U.S.C. 154(b) by 93 days.

(21) Appl. No.: 16/186,188

(22) Filed: Nov. 9, 2018

(65) Prior Publication Data
US 2019/0147564 A1   May 16, 2019

(30) Foreign Application Priority Data
Nov. 16, 2017   (EP) ..................................... 17202029

(51) Int. Cl.
*G06K 9/00* (2006.01)
*G06T 3/40* (2006.01)
*H04N 5/232* (2006.01)
*H04N 5/225* (2006.01)

(52) U.S. Cl.
CPC ....... *G06T 3/4038* (2013.01); *H04N 5/23238* (2013.01); *H04N 5/2258* (2013.01)

(58) Field of Classification Search
CPC combination set(s) only.
See application file for complete search history.

(56) References Cited

U.S. PATENT DOCUMENTS

| | | | |
|---|---|---|---|
| 6,529,613 B1 * | 3/2003 | Astle | G01S 3/7864 348/135 |
| 6,754,379 B2 | 6/2004 | Xiong et al. | |
| 9,098,922 B2 | 8/2015 | Tico | |
| 2008/0143820 A1 * | 6/2008 | Peterson | G06T 3/4038 348/36 |
| 2013/0329002 A1 * | 12/2013 | Tico | G06T 3/4038 348/36 |
| 2014/0022338 A1 | 1/2014 | Auberger et al. | |
| 2014/0300687 A1 * | 10/2014 | Gillard | G06T 15/20 348/36 |

OTHER PUBLICATIONS

Extended European Search Report dated May 7, 2018 for European Patent Application No. 17202029.9.

* cited by examiner

*Primary Examiner* — Alex Kok S Liew
(74) *Attorney, Agent, or Firm* — Volpe and Koenig, P.C.

(57) ABSTRACT

There is provided a method for blending a first image and a second image having overlapping fields of view. The first and the second images are blended in a blending region. A width of the blending region is selected based on similarity between a first set of camera parameters used when capturing the first image and a second set of camera parameters used when capturing the second image such that the width decreases with increasing similarity.

15 Claims, 4 Drawing Sheets

METHOD, DEVICE, AND CAMERA FOR BLENDING A FIRST AND A SECOND IMAGE HAVING OVERLAPPING FIELDS OF VIEW

FIELD OF INVENTION

The present disclosure relates to the field of blending of images. In particular, it relates to a method, a device, and a camera for blending a first image and a second image having overlapping fields of view.

BACKGROUND

Nowadays it is common to capture several images having overlapping fields of view and stitch them together so as to generate a panoramic image having a field of view corresponding to the combined field of view of the individual images. For example, a multi-sensor camera may be used to simultaneously capture several images and stitch the images together to provide a panoramic image.

Image stitching is generally the process of combining multiple images having overlapping fields of view. The stitching process may be divided into several process stages. First the images are aligned such that they are transformed to have matching viewpoints. For example, if two images are to be stitched, one of the images may be transformed to match the view point of the other of the images. The alignment stage may then be followed by a blending stage in which image data of the multiple images is combined in the overlap of the images, for example, by forming linear combinations of the image data. The purpose of the blending is to make the transition between the images smoother so that a user will experience the stitched image as one single image.

The blending stage of the stitching process is usually computationally demanding, especially if a large overlap between the images is to be blended. There is thus room for improvements.

SUMMARY

In view of the above, it is thus an object of the present teachings to provide a computationally efficient way of blending a first image and a second image having overlapping fields of view.

According to a first aspect of the present teachings, the above object is achieved by a method for blending a first image and a second image having overlapping fields of view, comprising: receiving a first image and a first set of camera parameters which were used when capturing the first image, and a second image and a second set of camera parameters which were used when capturing the second image, wherein the first image and the second image have fields of view which overlap in an overlapping region of the first and the second image and which do not overlap in a non-overlapping region of each of the first and the second image, and wherein the overlapping region has a first portion which is adjacent to the non-overlapping region of the first image but not to the non-overlapping region of the second image, and a second portion which is adjacent to the non-overlapping region of the second image but not to the non-overlapping region of the first image; selecting a blending region as those pixels in the overlapping region which are closer than a distance from a boundary between the first portion and the second portion, wherein the distance is selected based on similarity between the first set of camera parameters and the second set of camera parameters such that the distance decreases with increasing similarity; and blending the first image and the second image in the blending region.

The proposed method relies on the realization that when two overlapping images differ a lot, the images need to be blended in a large portion, or in the whole, of the overlap to achieve a smooth transition, whereas if the two images are similar, a smooth transition may be achieved although the images are blended in a smaller portion, or no portion at all, of the overlap. By varying the size of the portion of the overlap in which the images are blended based on similarity, the images are thus only blended in a portion of the overlap required to give a smooth transition. In this way the blending is kept to a minimum and computational resources are saved. For example, processing power is not spent on blending in the full overlapping region when blending in a smaller portion of the overlapping region is enough to provide a smooth transition between the images.

It has further been realized that a computationally efficient way of measuring similarity between the images is to compare camera parameters used when capturing the images. For example, assume that a window is in the field of view of the first image, but not in the second image, causing the amount of light to be different in the images. Such a difference between the images may be discovered from the camera parameters, such as from the values of gain and shutter speed. For instance, the image sensor capturing the first image will sense a different light level than the image sensor capturing the second image, and thereby select the camera parameters differently. By judging similarity between images based on similarity of camera parameters instead of evaluating the image data itself, further computational resources may be saved. For example, comparing camera parameters only involves comparing a few given numbers, such as calculating one or a few differences, whereas evaluating similarity based on image data would amount to more involved calculations, such as evaluating average values or histograms of intensity data.

By blending a first image and a second image is generally meant combining image data of the first and the second image.

By the first and the second image having fields of view which overlap means that there are pixels in the first and the second image, that is, the pixels in the overlapping region, which depict the same portion of the scene.

By similarity between the first set of camera parameters and the second set of camera parameters is meant similarity between values of the camera parameters of the first set and corresponding camera parameters of the second set. The similarity may, for example, be measured by calculating differences between the values.

Generally, during processing of images in a camera, it is known to provide the images with various types of metadata. However, the images are typically not provided with metadata already at the outset of the processing, that is, as they leave the image sensors. For the purpose of the present teachings, it has been found that it may be efficient to provide the camera parameters as metadata. More precisely, the first set of camera parameters may be received as metadata associated with the first image, and the second set of camera parameters may be received as metadata associated with the second image. In that way, the camera parameters associated with an image are readily available together with the images and need not be separately received.

The first and the second set of camera parameters may each comprise one or more camera parameters. Although one camera parameter, such as one of shutter speed, gain, and white balance, may be enough for the purposes of the present teachings, it has been found that the results are further improved if more than one camera parameter are used.

The one or more camera parameters may be related to the luminance level in the first and the second image. Using such camera parameters as a measure of the similarity of the images is advantageous since the human eye is particularly sensitive to the luminance level in images. If the luminance level is similar, the images will be perceived as similar by a human observer. As an example, the first and the second set of camera parameters may comprise at least one of shutter speed and gain. Thus, shutter speed or gain may be used on their own, or in combination. As is well known, the shutter speed controls the exposure in the image, thus affecting the luminance level in the image but also the motion blur. Further, the gain adjusts the level of light in the image but will also affect the noise in the image. Accordingly, both shutter speed and gain are related to the luminance level in the image.

The one or more camera parameters may further be related to the colour balance in the images. In particular, the first and the second set of camera parameters may comprise white balance. Although the camera parameter white balance may be used on its own, it is preferably used as a complement to camera parameters relating to the light level in the images.

In the overlapping region there is defined a boundary between the first portion of the overlapping region, being adjacent to the non-overlapping region of the first image but not to that of the second image, and the second portion of the overlapping region, being adjacent to the non-overlapping region of the second image but not to that of the first image. The boundary thus divides the overlapping regions into the first and the second portion. As explained above, blending is only carried out in a region around the boundary—the so called blending region. The region around the boundary may be defined as those pixels in the overlapping region which are closer than a distance from the boundary.

The boundary may take different shapes. For example, the boundary may be a straight line. A straight line may thus divide the overlapping region into the two portions. This results in a simple, yet efficient way of dividing the overlapping region into the two portions. However, embodiments where the boundary instead has a curved shape may also be envisaged.

In some embodiments the boundary is predefined and hence has a given position in the overlapping region. For example, the boundary may be predefined to be in the middle of the overlapping region. Accordingly, the first portion and the second portion of the overlapping region may have the same size. In this way, the blending is carried out in the middle of the overlapping region, which is reasonable and provides a good result for most applications.

However, there may be situations when it is preferred to not only be able to dynamically adjust the size of the blending region, but also to be able to dynamically adjust the position of blending region within the overlapping region. In order achieve that, the method may further comprise selecting the position of the boundary in the overlapping region.

An example of a situation where this is of interest is related to digital zoom, and in particular when a portion of the first and second image, when combined, is to be digitally zoomed in on. In more detail, the method may further comprise: receiving data indicating a zoom window corresponding to a portion of the first and the second image which is to be digitally zoomed in on, wherein the step of selecting a blending region further comprises selecting a position of the boundary in the overlapping region based on at least one of a size and a position of the zoom window in relation to the first and the second image.

In this way, one may, for example, avoid to have the blending region in the middle of the combined image, or in the middle of the zoom window, where the item of interest which is zoomed in is likely present.

Thus, the position of the boundary may be selected depending on how large the zoom window is in relation to the first and the second image, in other words, the level of zoom, and how the zoom window is positioned in relation to the first and the second image, for example, if it mostly covers the first image or the second image. It is thus possible to select the position of the boundary depending on the relative overlap of the zoom window with respect to the first and the second image. More specifically, the method may further comprise: calculating a first coinciding area of the zoom window and the non-overlapping portion of the first image, and a second coinciding area of the zoom window and the non-overlapping portion of the second image, wherein the position of the boundary is selected such that the first portion of the overlapping region is larger than the second portion of the overlapping region if the first coinciding area is larger than the second coinciding area, and the first portion of the overlapping region is smaller than the second portion of the overlapping region if the first coinciding area is smaller than the second coinciding area.

With this arrangement, the blending region is shifted towards the non-overlapping region of the image having less part in the zoom window. This may be advantageous in applications where a zoom window is panned over the overlapping region of the first and the second image. As the zoom window for instance pans over the overlapping region in the direction from the non-overlapping portion of the first image towards the non-overlapping portion of the second image, the boundary moves smoothly in the opposite direction, thereby giving a smooth transition the zoom window pans. For example, the position of the boundary in the overlapping region may selected such that a relation between an area of the first portion of the overlapping region and an area of the second portion of the overlapping region is equal to a relation between the first coinciding area and the second coinciding area.

According to the above, the size of the blending region, expressed in terms of the distance from the boundary, is selected based on similarity of the camera parameters. When this is further combined with zooming in on a portion of the first image and the second image, when combined, further adjustment of the blending region may have to be carried out. Since the zoom will also cause a zoom-in of the blending region, the size of the blending region, is preferably reduced with increasing zoom-level. In more detail, the distance may further be selected based on at least one of the size and the position of the zoom window in relation to the first and the second image.

The method may further comprise: generating a panoramic image from the first and the second image by: using image data from the first image in portions of the panoramic image corresponding to the non-overlapping portion of the first image and to the first portion of the overlapping region outside of the blending region; using image data from the second image in portions of the panoramic image corresponding to the non-overlapping portion of the second image and to the second portion of the overlapping region outside of the blending region; and using blended image data in a portion of the panoramic image corresponding to the blending region.

In this way, a panoramic image is generated in which blended image data is only used in the blending region.

The first image and the second image may be captured simultaneously by using different image sensors. Accordingly, the proposed method may advantageously be used in a multi-sensor camera.

According to a second aspect of the present teachings, the above object is achieved by a device for blending a first image and a second image having overlapping fields of view, comprising: a receiver configured to receive a first image and a first set of camera parameters which were used when capturing the first image, and a second image and a second set of camera parameters which were used when capturing the second image, wherein the first image and the second image have fields of view which overlap in an overlapping region of the first and the second image and which do not overlap in a non-overlapping region of each of the first and the second image, and wherein the overlapping region has a first portion which is adjacent to the non-overlapping region of the first image but not to the non-overlapping region of the second image, and a second portion which is adjacent to the non-overlapping region of the second image but not to the non-overlapping region of the first image, a selecting component configured to select a blending region as those pixels in the overlapping region which are closer than a distance from a boundary between the first portion and the second portion, wherein the distance is selected based on similarity between the first set of parameters and the second set of parameters such that the distance decreases with increasing similarity, and a blending component configured to blend the first image and the second image in the blending region.

According to a third aspect of the present teachings, the above objects are achieved by a camera including the device of the second aspect, wherein the camera is arranged to capture the first image using the first set of camera parameters, and the second image using the second set of camera parameters.

According to a fourth aspect of the present teachings, the above objects are achieved by a computer program product comprising a non-transitory computer-readable medium having computer code instructions stored thereon which are adapted to carry out the method of the first aspect when executed by a device having processing capability.

The second aspect, third and fourth aspects may generally have the same features and advantages as the first aspect. It is further noted that the present teachings relate to all possible combinations of features unless explicitly stated otherwise.

BRIEF DESCRIPTION OF THE DRAWINGS

A more detailed understanding may be had from the following description, given by way of example in conjunction with the accompanying drawings where.

DETAILED DESCRIPTION

The present teachings will now be described more fully hereinafter with reference to the accompanying drawings, in which embodiments are shown. The systems and devices disclosed herein will be described during operation.

Figure 1:
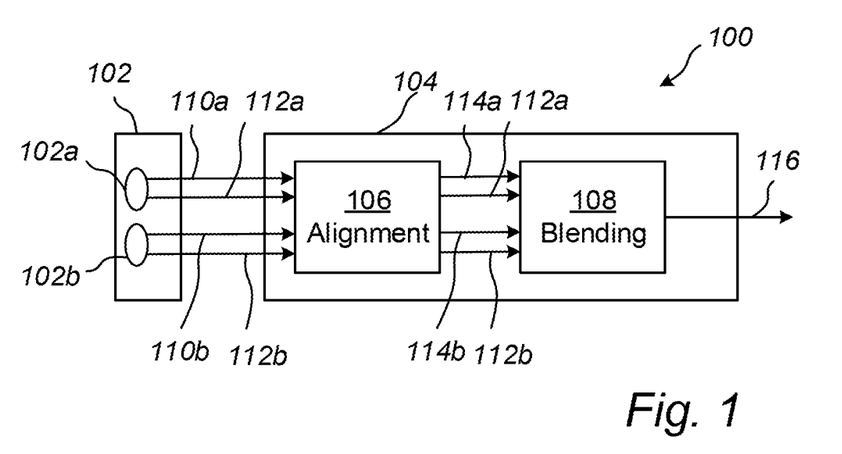
FIG. 1 illustrates a system in which embodiments may be implemented.

FIG. 1 illustrates a system 100 in which embodiments may be implemented. The system 100 comprises one or more image sensors 102 and a stitching module 104. The stitching module 104 in turn comprises an alignment device 106 and a blending device 108. The system 100 may be included in a camera. Alternatively, the one or more image sensors 102 may be included in a camera while the stitching module 104 may be located remotely from the camera, such as in a client device which communicates with the camera over a network. Embodiments may also be used in modular camera systems, where one or more image sensors are connected by wire to a control unit. In such systems the stitching module may be included in the control unit.

The one or more image sensors 102, here shown as a first image sensor 102a and a second image sensor 102b, are arranged to capture a first image 110a and a second image 110b. For example, the first image sensor 102a and the second image sensor 102b may be arranged to simultaneously capture the first image 110a and the second image 110b, respectively. Alternatively, the first image 110a and the second image 110b may be captured sequentially by the one or more image sensors 102. The first image 110a and the second image 110b have overlapping, but not identical fields of view.

The one or more image sensors 102 use camera parameters when capturing the first image 110a and the second image 110b. The camera parameters may, for example, include shutter speed, gain, and white balance. The camera parameters used are typically set automatically by the camera, for example, applying an auto-exposure algorithm.

The one or more image sensors 102 are configured to forward the first image 110a and the second image 110b to the stitching module 104. Additionally, the one or more image sensors 102 are configured to forward a first set of camera parameters 112a associated with the first image 110a, and a second set of camera parameters 112b associated with the second image 110b. The first 112a and the second 112b set of camera parameters include one or more of the camera parameters used by the one or more image sensors 102 when capturing the first image 110a and the second image 110b, respectively. By way of example, the first and the second set of camera parameters 112a, 112b may each include one or more of shutter speed, gain, and white balance. Preferably, the first and the second set of camera parameters 112a, 112b each include at least shutter speed and gain.

The first and the second set of camera parameters 112a, 112b may be forwarded separately from the first 110a and the second 110b image. However, according to example embodiments the first and the second set of camera parameters 112a, 112b may be forwarded together with the first and the second image 110a, 110b, respectively, in the form of metadata.

The alignment device 106 is arranged to align the first and the second image 110a, 110b. The alignment may, inter alia, include performing barrel-correction, rotating the images, and performing projection of the first image 11a and the second image 110b, for instance onto a sphere or a cylinder. The latter is made to compensate for the fact that the first and the second image sensor 102a, 102b are not mounted in the same position, meaning that the scene is depicted from different points of view. This may be corrected for by performing a projection, thereby giving a viewer an impression of the frames being captured from the same point of view. The particular alignment to apply is typically the same for each image captured by the image sensors 102 following an initial calibration of the image sensors 102. Thus, the alignment may be made on basis of parameters from a calibration of the image sensors 102 of the camera. The first and the second image after alignment are shown as items 114a, and 114b, respectively.

After alignment, the first and the second image 114a, 114b, and the first and the second set of camera parameters 112a, 112b are forwarded to the blending device 108 which is arranged to blend the first and the second image 114a, 114b. In the end, the blending device 108 may output a panoramic image 116 which is a combination of the first and the second image 114, 114b.

Figure 2:
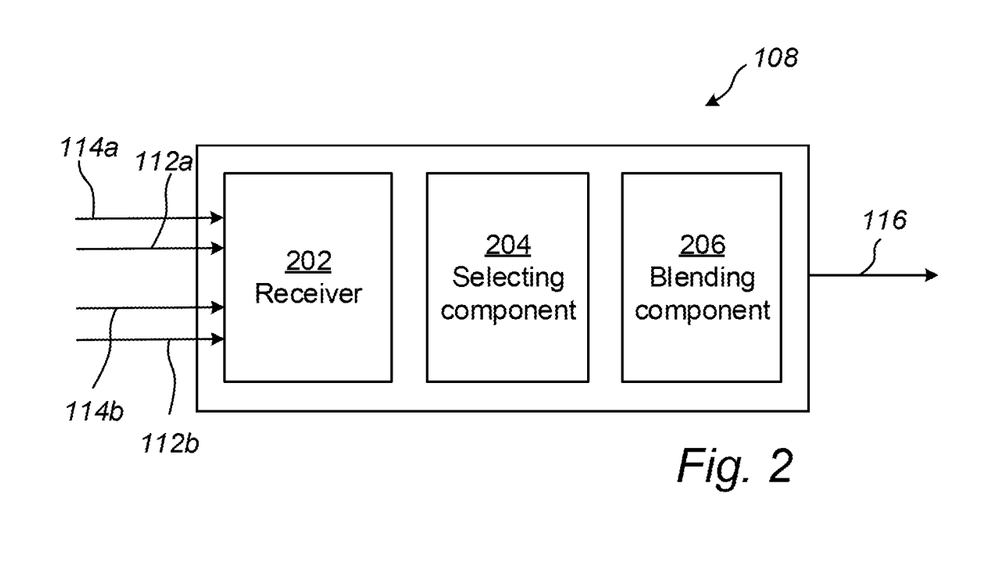
FIG. 2 illustrates internal components of a blending device according to embodiments.

The blending device 108 is shown in more detail in FIG. 2. The blending device 108 includes a receiver 202, a selecting component 204, and a blending component 206.

Generally, the blending device 108 may comprise circuitry which is configured to implement the components 202, 204, 206 and, more specifically, their functionality.

In a hardware implementation, each of the components 202, 204, 206, may correspond to circuitry which is dedicated and specifically designed to provide the functionality of the component. The circuitry may be in the form of one or more integrated circuits, such as one or more application specific integrated circuits. By way of example, the blending component 206 may thus comprise circuitry which, when in use, blends the first and the second image 114a, 114b.

In a software implementation, the circuitry may instead be in the form of one or more processors, such as one or more microprocessors, which in association with computer code instructions stored on a (non-transitory) computer-readable medium, such as a non-volatile memory, causes the blending device 108 to carry out any method disclosed herein. In that case, the components 202, 204, 206, may thus each correspond to a portion of computer code instructions stored on the computer-readable medium, that, when executed by the processor, causes the blending device 108 to carry out the functionality of the component.

It is to be understood that it is also possible to have a combination of a hardware and a software implementation, meaning that the functionality of some of the components 202, 204, 206 are implemented in hardware and others in software.

What was said above regarding the implementation of the blending device 108 in terms of circuitry (hardware and/or software) applies to the alignment device 108 mutatis mutandis.

The operation of the blending device will now be described with reference to the flow chart of FIG. 3 and FIGS. 2, 4a-b, 5a-b, 6a-b, and 7a-b.

Figure 3:
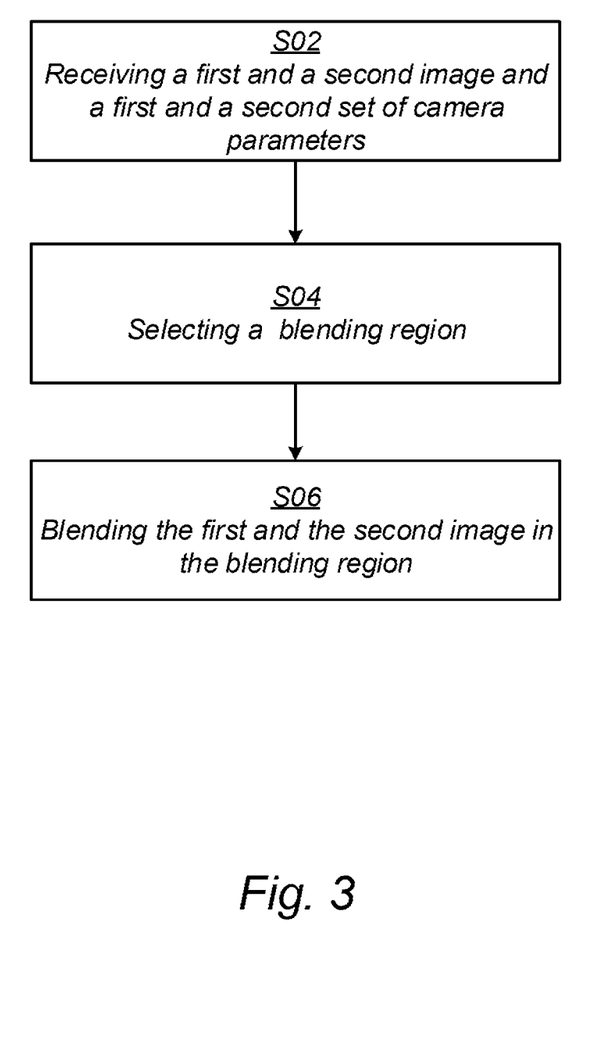
FIG. 3 is a flow chart of a method for blending a first image and a second image having overlapping fields of view according to embodiments.

In step S02, the receiver 202 receives the first image 114a, the second image 114b, the first set of camera parameters 112a, and the second set of camera parameters 112b. The first set of camera parameters 112a may be provided as metadata of the first image 114a and the second set of camera parameters 112b may be provided as metadata of the second image 114b. As explained above, the first image and the second image 114a, 114b received by the receiver 202 are aligned with each other.

Figure 4A:
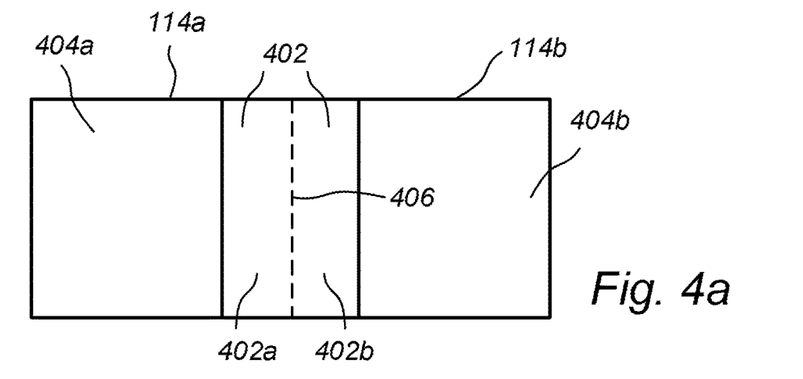
FIGS. 4a and 4b illustrate a first image and a second image having overlapping fields of view according to embodiments.

FIG. 4a illustrates the first image 114a and the second image 114b. The first image 114a and the second image 114b have overlapping fields of view. In particular, the first image 114a and the second image 114b have fields of view which overlap in an overlapping region 402, and which do not overlap in a non-overlapping region 404a of the first image 114a and in a non-overlapping region 404b of the second image 114b. The overlapping region 402 further has a first portion 402a which is adjacent to the non-overlapping region 404a of the first image 114a but not the non-overlapping region 404b of the second image 114b, and a second portion 402b which is adjacent to the non-overlapping portion 404b of the second image 114b but not to the non-overlapping region 404a of the first image 114a. The first and the second portion 402a, 402b are also adjacent to each other. In particular, there is a boundary 406 defined between the first portion 402a and the second portion 402b. As shown in FIG. 4a, the boundary 406 may be a straight line, although in other embodiments it may have other shapes, such as a curve. Further, as shown in FIG. 4a, the boundary 406 may divide the overlapping region 402 into two portions of equal area, that is, the first and the second portion 402a, 402b may have the same size.

Figure 5A:
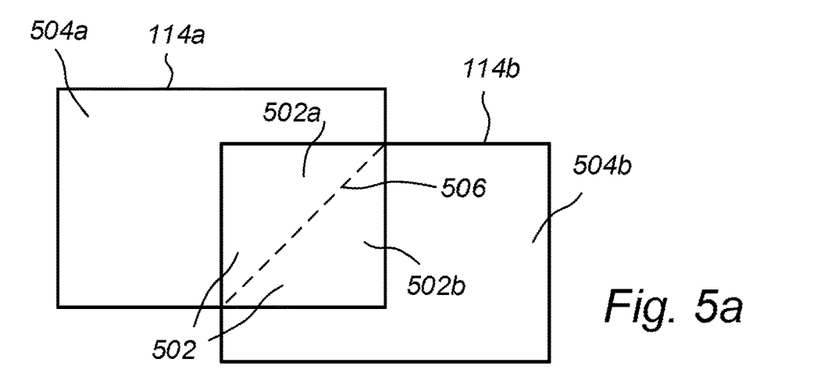
FIGS. 5a and 5b illustrate a first image and a second image having overlapping fields of view according to embodiments.

FIG. 5a illustrates another embodiment where the first and the second image 114a, 114b are not horizontally aligned. However, also in that embodiment there is an overlapping region 502 in which the images overlap, and each of the first and the second image 114a, 114b has a non-overlapping region 504a, 504b where it does not overlap with the other of the first and the second image 114a, 114b. Again the overlapping region 502 has a first portion 502a which is adjacent to the non-overlapping region 504a of the first image 114a but not to that of the second image 114b, and a second portion 502b which is adjacent to the non-overlapping region 504b of the second image 114b but not to that of the first image 114a. A boundary 506 in the overlapping region 502, here in the form of a straight line, divides the overlapping region 502 into the first portion 502a and the second portion 502b.

Figure 4B:
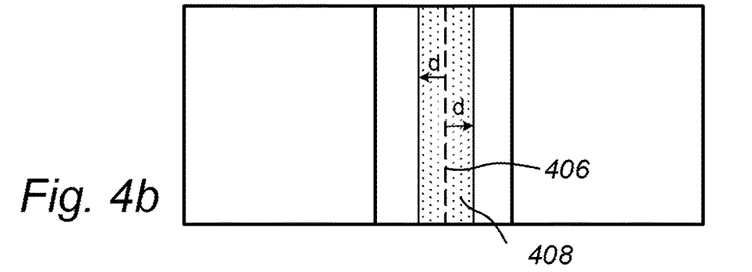
Figure 5B:
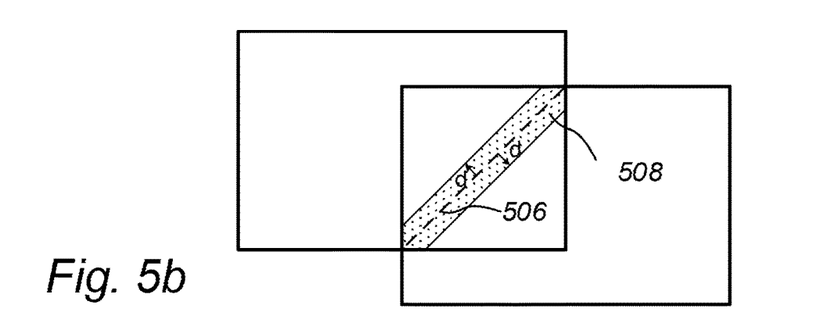

In step S04, the selecting component 204 proceeds to select a blending region 408, 508 as further illustrated in FIGS. 4b and 5b. The blending region 408, 508 is a subset of the overlapping region 402, 502. More specifically, the selecting component 204 selects the blending region 408, 508 such that it includes those pixels in the overlapping region 402, 502 which are closer than a distance d from the boundary 406, 506. The blending region 408, 508 thus extends along the boundary 406, 506 and has a width corresponding to twice the distance d. The selecting component 204 sets the size, that is, the area, of the blending region 408, 508 based on similarity between the first and the second set of camera parameters 112a, 112b. The higher the similarity between the camera parameters 112a, 122b, the smaller the size of the blending region 408, 508. In order to set the size of the blending region 408, 508, the selecting component 204 may set the width of the blending region 408, 508, for example, by setting the distance d from the boundary 406, 506 such that the distance d decreases with increasing similarity.

The selecting component 204 may evaluate the similarity between the first and the second set of camera parameters 112a, 112b by comparing corresponding parameters of the first set and the second set 112a, 112b of camera parameters. For example, the selecting component 204 may calculate differences between corresponding parameters of the first set and the second set 112a, 112b. In case only one camera parameter is used, the so calculated difference may be used as a measure of similarity. If more than one camera parameters are used, the calculated differences may be combined into a single value, for example, by calculating a weighted sum of the absolute values of the differences, a weighted sum of the squared differences, or by applying any other function to the differences which is suitable for combining the differences into a single value. The selecting component 204 may then map the so calculated similarity measure to a suitable value of the width (or the distance d) of the blending region 408, for example, by using a predefined function or table stored by the selecting component 204 for that purpose. For example, the predefined function may map the similarity measure to the distance d such that the blending region 408 covers the whole overlapping region 402 when the similarity measure is below a first threshold (twice the distance d equals the width of the overlapping region 402), the blending region 408 is empty (distance d is zero) when the similarity measure is above a second threshold, and the distance d varies according to a monotone and decreasing function (such as linearly) between these two extremes as the similarity measure increases.

In the examples of FIGS. 4a-b and 5a-b, the boundary 406, 506 was assumed to be pre-defined and located in the middle of the overlapping region 402, 502, such that it divides the overlapping region 402, 502, into two portions 402a, 402b, 502a, 502b of equal size. However, in some embodiments, when selecting the blending region 408, 508, the selecting component 204 may also select the position of the boundary 406, 506 in the overlapping region.

FIGS. 6a-b and 7a-b illustrates examples of such embodiments where the selecting component 204 selects the position of the boundary 406, 506 in the overlapping region 402, 502 based on at least one of a size and a position of a zoom window 610, 710 in relation to the first and the second image 114a, 114b.

Figure 6A:
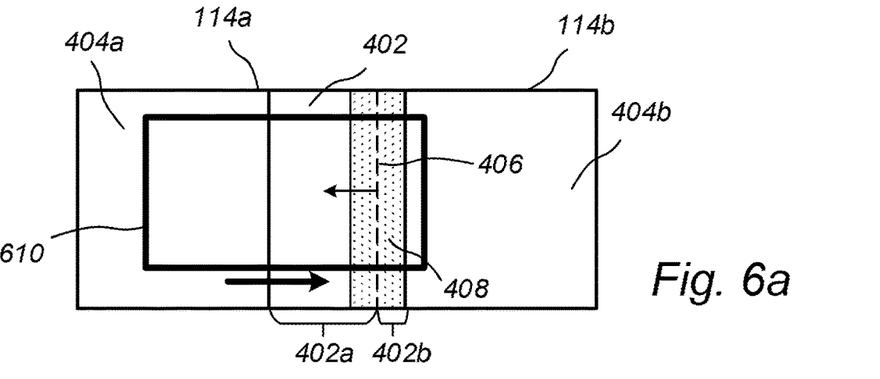
FIGS. 6a and 6b illustrate a first image and a second image having overlapping fields of view, and a zoom window according to embodiments.
Figure 6B:
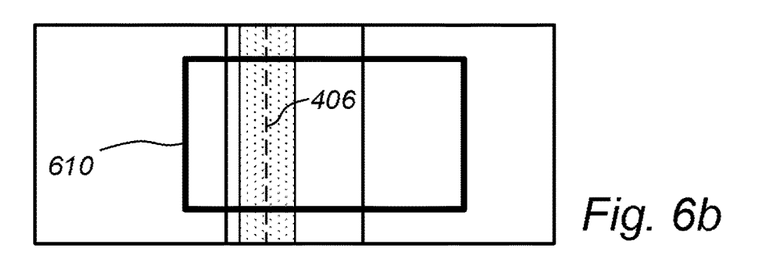
Figure 7A:
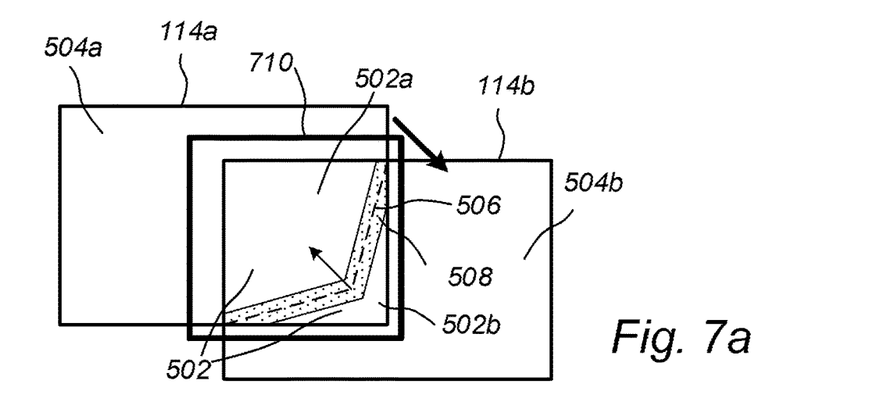
FIGS. 7a and 7b illustrate a first image and a second image having overlapping fields of view, and a zoom window according to embodiments.
Figure 7B:
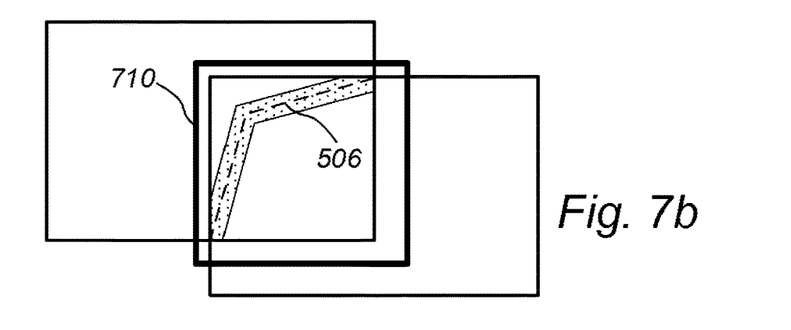

The selecting component 204 may receive data indicating a zoom window 610, 710 corresponding to a portion of the first image 114a and the second image 114b to be zoomed in on. From the received data, the selecting component 204 may relate at least one of the size and the position of the zoom window 610, 710 to the first and the second image 114a, 114b, that is, to the combined field of view of the first and the second image 114a, 114b. For example, the selecting component 204 may calculate a first coinciding area being the area where the zoom window 610, 710 coincides, that is, overlaps, with the non-overlapping portion 404a, 504a of the first image 114a, and a second coinciding area being the area where the zoom window 610 coincides, that is, overlaps, with the non-overlapping portion 404b, 504b of the second image 114b. The position of the boundary 406, 506, may then be selected on basis of the relation between at least one of the size and shape of the zoom window 610, 710. More specifically, the position of the boundary 406 may be selected such that the first portion 402a of the overlapping region 402 is larger than the second portion 402b of the overlapping region 402 if the first coinciding area is larger than the second coinciding area, as shown in FIGS. 6a and 7a, and vice versa as shown in FIGS. 6b and 7b. In particular, the position of the boundary 406, 506 may be selected such that a relation between the area of the first portion 402a, 502a and the second portion 402b, 502b of the overlapping region 402, 502 is equal to a relation between the first coinciding area and the second coinciding area. Accordingly, as the zoom window 610 moves to the right as indicated in FIG. 6a, for example, to the position of the zoom window shown in FIG. 6b, the second coinciding area increases in relation to the first coinciding area, thereby causing the second portion 402b to increase in relation to the first portion 402a, meaning that the boundary 406 moves to the left, for example, to the position of the boundary 406 shown in FIG. 6b. Further, as the zoom window 710 moves diagonally downwards as indicated in FIG. 7a, for example, to the position of the zoom window 710 shown in FIG. 7b, the second coinciding area increases in relation to the first coinciding area, thereby causing the second portion 502b to increase in relation to the first portion 502a, meaning that the boundary 506 moves diagonally upwards, for example, to the position of the boundary 506 shown in FIG. 7b.

As discussed above, the size of the blending region 408, 508 is thus selected based on similarity. Additionally, the position of the blending region 408, 508 in the overlapping region 402 may be selected, for example, based on the size and/or position of a zoom window. In embodiments relating to zooming, the size of the blending region 408, 508 may further be selected or adjusted based on at least one of the size and position of the zoom window 610, 710 in relation to the first and the second image 114a, 114b. For example, since the zoom will also cause a zoom-in of the blending region 408, 508, the size of the blending region 408, 508, is preferably reduced with increasing zoom-level, that is, as the size of the zoom window decreases in relation to the size of the combined field of view of the first and the second image 114a, 114b.

Further, in case the overlap of the zoom window 610, 710 with the first image is larger than the overlap with the second image (or vice versa), that is, such as in FIGS. 6a and 7a, it may be reasonable to reduce the size of the blending region 408, 508, despite the two images having differing camera parameters. In the extreme case, in case the zoom window does not overlap with one of the non-overlapping portions 404a, 404b, the blending region may be set to be empty (d equals zero) and image data of only one of the images (the one having a non-overlapping portion 404a, 404b which overlaps with the zoom window) may be used to create a panoramic image in that case.

In step S06, the blending component 206 proceeds to blend the first image 114a and the second image 114b in the blending region 408, 508 only. By blending is generally meant that the image data of the first image 114a and the second image 114b is combined, such as by forming linear combinations of image data in corresponding pixels of the first and the second image 114a, 114b. For example, the first image 114a and the second image 114b may be blended in the blending region 408, 508 using so-called alpha-blending as known in the art.

As previously explained, the blending is typically a part of the process of stitching the first and the second image 114a, 114b together so as to generate a panoramic image 116. The panoramic image 116 corresponds to the combined field of view of the first image and the second image 114a, 114b. The panoramic image 116 hence has portions corresponding to the non-overlapping portions 404a, 404b, 504a, 504b, the overlapping portion 402, 502, and the blending region 408, 508. When generating the panoramic image 116, the blending component 206 uses blended image data in the portion of the panoramic 116 corresponding to the blending region 408, 508. In all other portions of the panoramic image 116 image data from either the first or the second image 114a, 114b is used. More specifically, the blending component 206 may generate the panoramic image 116 by using image data from the first image 114a in a portion of the panoramic image corresponding to the non-overlapping portion 404a, 504a of the first image 114a, and in a portion of the panoramic image 116 corresponding to the first portion 402a, 502a of the overlapping region outside of the blending region 408, 508. Likewise, the blending component 206 may use image data from the second image 114b in a portion of the panoramic image 116 corresponding to the non-overlapping portion 404b, 504b of the second image 114b, and in a portion of the panoramic image 116 corresponding to the second portion 402b, 502b of the overlapping region outside of the blending region 408, 508.

It will be appreciated that a person skilled in the art can modify the above-described embodiments in many ways and still use the advantages of the present teachings as shown in the embodiments above. For example, although the above disclosure relates to blending of two images having overlapping fields of view, the same methodology may be used to blend more than two images having overlapping fields of view. Thus, the present teachings should not be limited to the shown embodiments but should only be defined by the appended claims. Additionally, as the skilled person understands, the shown embodiments may be combined.

What is claimed is:

1. A method for blending a first image and a second image having overlapping fields of view, comprising:
   receiving a first image and a first set of camera parameters which were used when capturing the first image, and a second image and a second set of camera parameters which were used when capturing the second image,
   wherein the first image and the second image are aligned with each other,
   wherein the first image and the second image have fields of view which overlap in an overlapping region of the first and the second image and which do not overlap in a non-overlapping region of each of the first and the second image, and
   wherein the overlapping region has a first portion and a second portion which are adjacent to each other such that a boundary is defined between the first portion and the second portion, the first portion further being adjacent to the non-overlapping region of the first image but not to the non-overlapping region of the second image, and the second portion further being adjacent to the non-overlapping region of the second image but not to the non-overlapping region of the first image;
   blending the first image and the second image in a blending region; and
   selecting the blending region as those pixels in the overlapping region which are closer than a distance from the boundary between the first portion and the second portion, wherein the distance is selected based on similarity between the first set of camera parameters and the second set of camera parameters such that the distance decreases with increasing similarity.

2. The method of claim 1, wherein the first set of camera parameters are received as metadata associated with the first image, and the second set of camera parameters are received as metadata associated with the second image.

3. The method of claim 1, wherein the first and the second set of camera parameters comprise at least one of shutter speed and gain.

4. The method of claim 1, wherein the first and the second set of camera parameters comprise white balance.

5. The method of claim 1, wherein the boundary is a straight line.

6. The method of claim 1, wherein the first portion and the second portion of the overlapping region have the same size.

7. The method of claim 1, further comprising:
   receiving data indicating a zoom window corresponding to a portion of the first and the second image which is to be digitally zoomed in on,
   wherein the step of selecting a blending region further comprises selecting a position of the boundary in the overlapping region based on at least one of a size and a position of the zoom window in relation to the first and the second image.

8. The method of claim 7, further comprising:
   calculating a first coinciding area of the zoom window and the non-overlapping portion of the first image, and a second coinciding area of the zoom window and the non-overlapping portion of the second image,
   wherein the position of the boundary is selected such that the first portion of the overlapping region is larger than the second portion of the overlapping region if the first coinciding area is larger than the second coinciding area, and the first portion of the overlapping region is smaller than the second portion of the overlapping region if the first coinciding area is smaller than the second coinciding area.

9. The method of claim 8, wherein the position of the boundary in the overlapping region is selected such that a relation between an area of the first portion of the overlapping region and an area of the second portion of the overlapping region is equal to a relation between the first coinciding area and the second coinciding area.

10. The method of claim 7, wherein the distance is further selected based on at least one of the size and position of the zoom window in relation to the first and the second image.

11. The method of claim 1, further comprising:
   generating a panoramic image from the first and the second image by:
      using image data from the first image in portions of the panoramic image corresponding to the non-overlapping portion of the first image and to the first portion of the overlapping region outside of the blending region;
      using image data from the second image in portions of the panoramic image corresponding to the non-overlapping portion of the second image and to the second portion of the overlapping region outside of the blending region; and
      using blended image data in a portion of the panoramic image corresponding to the blending region.

12. The method of claim 1, wherein the first image and the second image are captured simultaneously by using different image sensors.

13. A device for blending a first image and a second image having overlapping fields of view, comprising:
   a receiver configured to receive a first image and a first set of camera parameters which were used when capturing the first image, and a second image and a second set of camera parameters which were used when capturing the second image,
   wherein the first image and the second image are aligned with each other,
   wherein the first image and the second image have fields of view which overlap in an overlapping region of the first and the second image and which do not overlap in a non-overlapping region of each of the first and the second image, and wherein the overlapping region has a first portion and a second portion which are adjacent to each other such that a boundary is defined between the first portion and the second portion, the first portion further being adjacent to the non-overlapping region of the first image but not to the non-overlapping region of the second image, and the second portion further being adjacent to the non-overlapping region of the second image but not to the non-overlapping region of the first image;

a blending component configured to blend the first image and the second image in a blending region; and a selecting component configured to select the blending region as those pixels in the overlapping region which are closer than a distance from a boundary between the first portion and the second portion, wherein the distance is selected based on similarity between the first set of parameters and the second set of parameters such that the distance decreases with increasing similarity.

14. A camera comprising:

one or more sensors configured to capture a first image and a second image, wherein the first image is captured using a first set of camera parameters and the second image is captured using a second set of camera parameters;

a receiver configured to receive the first image and the first set of camera parameters which were used when capturing the first image, and the second image and the second set of camera parameters which were used when capturing the second image, wherein the first image and the second image are aligned with each other, wherein the first image and the second image have fields of view which overlap in an overlapping region of the first and the second image and which do not overlap in a non-overlapping region of each of the first and the second image, and wherein the overlapping region has a first portion and a second portion which are adjacent to each other such that a boundary is defined between the first portion and the second portion, the first portion further being adjacent to the non-overlapping region of the first image but not to the non-overlapping region of the second image, and the second portion further being adjacent to the non-overlapping region of the second image but not to the non-overlapping region of the first image;

a blending component configured to blend the first image and the second image in a blending region; and a selecting component configured to select the blending region as those pixels in the overlapping region which are closer than a distance from a boundary between the first portion and the second portion, wherein the distance is selected based on similarity between the first set of parameters and the second set of parameters such that the distance decreases with increasing similarity.

15. A non-transitory computer readable storage medium including instructions which, when executed by a computing device having a processing capability, cause the computing device to execute instructions for blending a first image and a second image having overlapping fields of view, the instructions causing the computing device to perform operations comprising:

receiving a first image and a first set of camera parameters which were used when capturing the first image, and a second image and a second set of camera parameters which were used when capturing the second image, wherein the first image and the second image are aligned with each other, wherein the first image and the second image have fields of view which overlap in an overlapping region of the first and the second image and which do not overlap in a non-overlapping region of each of the first and the second image, and wherein the overlapping region has a first portion and a second portion which are adjacent to each other such that a boundary is defined between the first portion and the second portion, the first portion further being adjacent to the non-overlapping region of the first image but not to the non-overlapping region of the second image, and the second portion further being adjacent to the non-overlapping region of the second image but not to the non-overlapping region of the first image;

blending the first image and the second image in a blending region; and selecting the blending region as those pixels in the overlapping region which are closer than a distance from the boundary between the first portion and the second portion, wherein the distance is selected based on similarity between the first set of camera parameters and the second set of camera parameters such that the distance decreases with increasing similarity.

* * * * *